(12) United States Patent
Vanderbeken et al.

(10) Patent No.: US 10,898,907 B2
(45) Date of Patent: Jan. 26, 2021

(54) METHOD AND APPARATUS TO REMOVE CONTAMINANTS FROM AN ORGANICS WASTE STREAM AND FILTERING LIGHT ORGANICS FROM FLUIDS

(71) Applicant: Cedric Jean-Luc Vanderbeken, Sudbury (CA)

(72) Inventors: Marc Alphonse Vanderbeken, Quebec (CA); Cedric Jean-Luc Vanderbeken, Boise, ID (US); Olivier Hugo Christopher Dany Vanderbeken, Sudbury (CA)

(*) Notice: Subject to any disclaimer, the term of this patent is extended or adjusted under 35 U.S.C. 154(b) by 0 days.

(21) Appl. No.: 16/276,606

(22) Filed: Feb. 14, 2019

(65) Prior Publication Data

US 2019/0381520 A1 Dec. 19, 2019

Related U.S. Application Data

(63) Continuation-in-part of application No. 15/965,509, filed on Jun. 19, 2018, now abandoned.

(51) Int. Cl.
| | |
|---|---|
| *B04C 5/103* | (2006.01) |
| *B04C 5/10* | (2006.01) |
| *B04C 9/00* | (2006.01) |
| *B07B 7/086* | (2006.01) |
| *B07B 11/06* | (2006.01) |
| *B04C 5/14* | (2006.01) |

(52) U.S. Cl.
CPC ............... *B04C 5/103* (2013.01); *B04C 5/10* (2013.01); *B04C 5/14* (2013.01); *B04C 9/00* (2013.01); *B07B 7/086* (2013.01); *B07B 11/06* (2013.01); *B04C 2009/007* (2013.01); *B07B 2220/02* (2013.01)

(58) Field of Classification Search
CPC .... B07B 1/20; B07B 4/08; B07B 4/00; B07B 7/06; B07B 7/083; B07B 2220/02; B07B 7/086; B07B 11/06; B02C 19/0018; B02C 2023/165; B02C 23/10; B02C 23/16; B04C 5/103; B04C 5/10; B04C 5/14; B04C 9/00; B04C 2009/007
See application file for complete search history.

(56) References Cited

U.S. PATENT DOCUMENTS

| | | | |
|---|---|---|---|
| 2011/0259985 A1* | 10/2011 | Schiffer | ............... B02C 13/284 241/277 |
| 2012/0119003 A1* | 5/2012 | Watts | ...................... B02C 18/12 241/30 |
| 2019/0111440 A1* | 4/2019 | Theodoulou | ............ B02C 23/20 |

* cited by examiner

*Primary Examiner* — Kortney L. Klinkel

(57) ABSTRACT

An improved process and apparatus for separating organics and inorganics from waste material with a specific object of preparing the separated organic fraction for the production of biogas or other methods for diverting organics from landfills. Waste material, such as municipal solid waste or source-separated organic waste (SSO), is subjected to a first separation treatment that separates organic and inorganic waste components. The apparatus includes a hopper to receive contaminated organic waste from different sources, a vertical separator that separates the inorganics from the organics by creating a vortex effect in a stationary filtration drum by which the solid contaminants (paper, plastic, metals) are blown in a spiral pattern upwards and removed from the top, while the organic fraction is removed from the bottom. Such apparatus is improved through several methods to reduce or eliminate blockages and their associated downtime, and to increase the efficiency of the separation process.

4 Claims, 5 Drawing Sheets

FIGURE 2
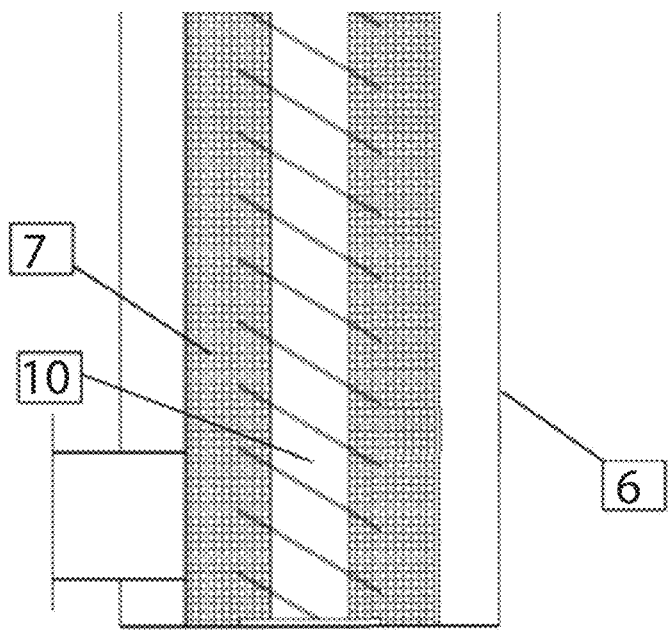
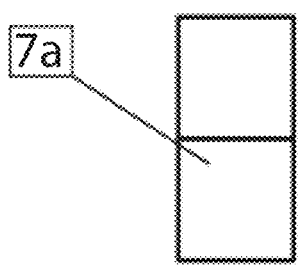

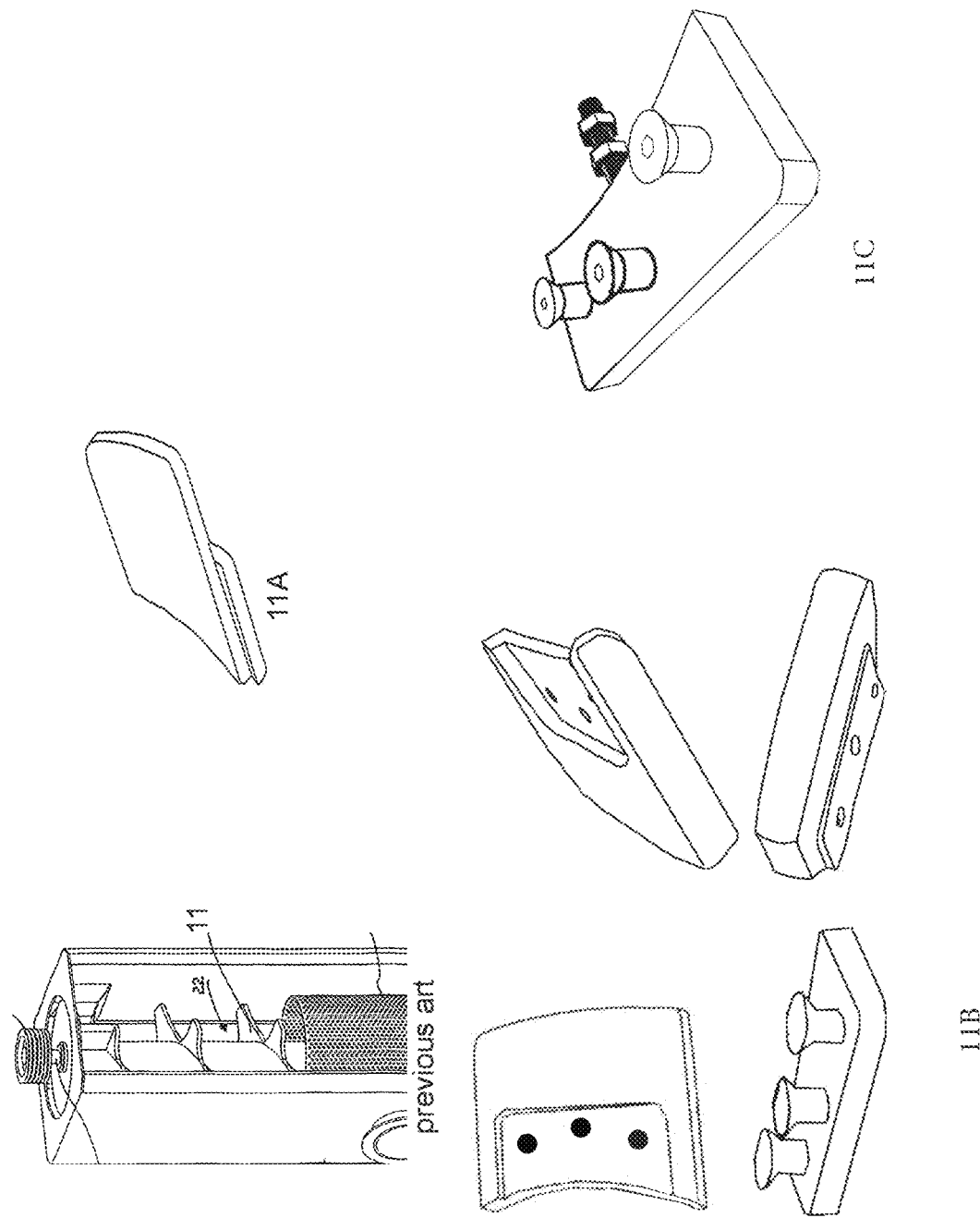

METHOD AND APPARATUS TO REMOVE CONTAMINANTS FROM AN ORGANICS WASTE STREAM AND FILTERING LIGHT ORGANICS FROM FLUIDS

This application is a continuation in part (continuation) of application Ser. No. 15/965,509 filed on Jun. 19, 2018 and allowed on Jan. 9, 2019.

BACKGROUND OF THE INVENTION

Field of the Invention

The present invention relates to improvements to a method and apparatus for processing and depackaging waste materials, such as municipal solid waste (MSW) and food waste materials including source-separated organics (SSO), to be treated prior to further processing such as to be transformed into biogas in an anaerobic digester and consequently transformed into renewable fuels, or to be converted into animal feed additives, organic fertilizers or compost, as well as removing light materials from a liquid stream.

Background Information

The disposal of municipal solid waste (MSW) and food-waste materials has become a problem in the entire world. New regulations require organics to be diverted from landfills or ban completely organics from landfill sites, as well as incinerators. But the organic waste streams are often mixed with packaging materials (plastic wrappings, parts of wooden pallets, or long fibrous wrapping materials) or with inorganics and other non-useful waste streams. The plastic and fibrous wrapping materials cause significant operational problems for equipment designed to separate the useful organic fraction from the other waste streams.

Prior art for separating the useful organic fraction from MSW and from food waste are described in representative patents:

- GB 2354720 A (Ian Houghton, Apr. 4, 2001)
- EP 2006 034 B1 (Giuliano Toninelli, 2006)
- US-20110146639-A1 (Martinengo Herve, 2011)
- US 20160207806-A1 (OUDE GROTEBEVELSBORG; Willem January 2016)
- U.S. Pat. No. 6,672,461-B2 (Miller; Lawrence J., 2016)
- U.S. Pat. No. 3,973,735-A (Ito; Kanichi, 2004)

The apparatus described within these representative patent documents all have severe operational shortcomings that are prevented with the novel improvements described in the following sections.

SUMMARY OF THE INVENTION

The present invention has the task of proposing an improved device and a method for the extraction of organics out of a mixed organics-inorganics waste stream or expired pre-packaged food product prior to composting, treatment in an anaerobic digester or transformation in nutrients, or removal of contaminants or light materials from a liquid waste or wash water stream.

1. The use of chains to pretreat the incoming waste stream and chop up plastic wrappings that plug up existing separation apparatus, and the use of chains to grind the fibrous organics accumulated at the bottom of the screen.
2. The use of closely spaced square or rectangular openings in the screening drum, which removes the useful organic fraction from the waste stream, as opposed to the conventional use of circular. This improvement significantly increases the efficiency and the throughput of the separation process.
3. The use of a tangential discharge at the top of the screening drum, as opposed to a centrally located discharge. This improvement decreases blockage at the discharge to the apparatus and increases capacity.
4. The use of a speed adjustment on the paddle drum in order to adapt the separation process to different feed stocks.
5. The use of field-replaceable, sectional filter panels to adapt the separation process to different feed stocks.
6. The use of field replaceable paddles.

BRIEF DESCRIPTION OF THE DRAWINGS

Drawing 1 provides a schematic side view of the device for the extraction of organics out of a mixed organics-inorganics waste stream or expired pre-packaged food product. The waste stream (1) is dumped into a feed hopper (2). Two augers (3) & (4) that are located at the bottom of hopper (2) counter-rotate to help prevent waste-stream bridging within hopper (2). Feed auger (4) moves the broken-up waste stream and associated air stream through opening (5) into the bottom of the separation apparatus.

The separation apparatus consists of an outer housing (6) that may be cylindrical or rectangular in cross-section, a cylindrical screening drum (7), an inner rotating paddle-drum (10) with a motor (12) and a tangential discharge opening (13). Fastened to the exterior of the rotating paddle-drum (10) are 2 or more breakup chains (8) that are made of a strong wear-resistant metal or plastic material and are square in cross-section or otherwise fabricated as to provide sharp edges that facilitate the chopping plus a multiplicity of field-replaceable paddles (11). The paddles (11) may be fixed or may be adjustable so that their angle can be varied depending upon the requirements of the separation process. The speed of the paddle rotor can be adjusted by adjusting pulleys or by a VFD.

Figure 1:
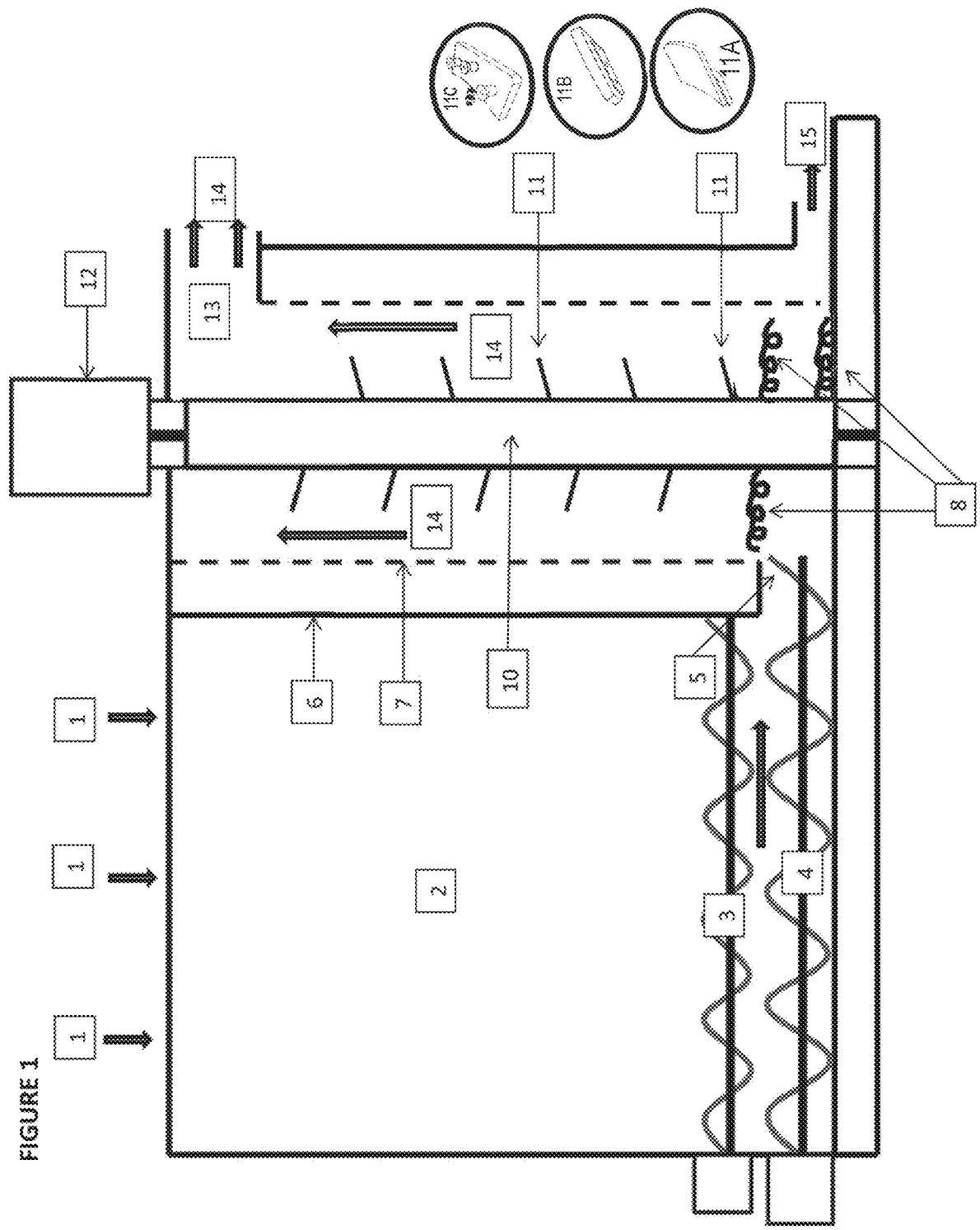
Figure 3:
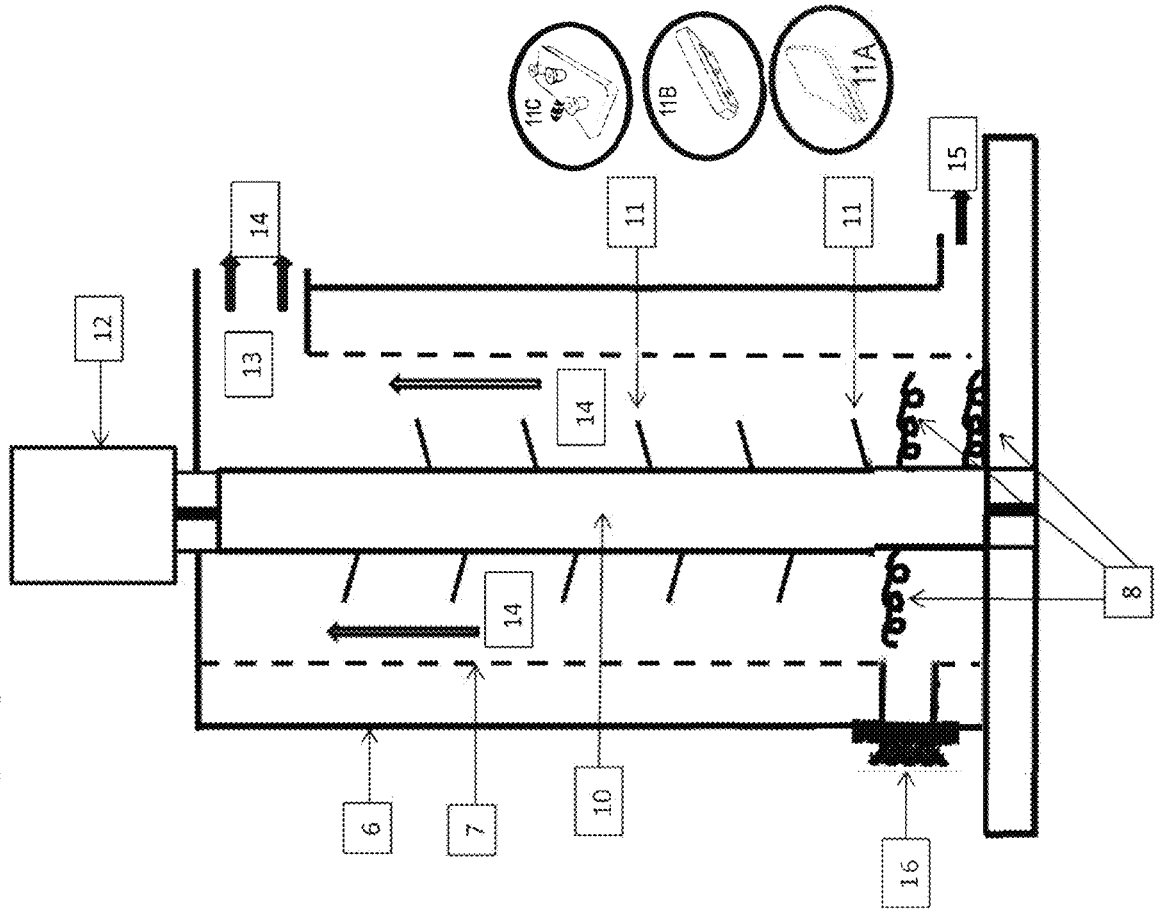

The waste stream entering through opening (5) or (16) into the bottom of the separation apparatus is further broken up by means of rapidly rotating chains (8) and projected against the inside of the stationary drum. The waste stream entering through opening 5 or 16 can either be from the side or tangentially introduced. The multiplicity of paddles (11) attached to the inner rotating paddle-drum (10) are inclined at an angle and hence act as propellers to thrust the mixture of air and waste solids in an upwards spiral within the annular space between screening drum (7) and inner rotating paddle-drum (10). The upwards spiral, or vortex, comparable to the movement of a twister or waterspout, throws the waste solids radially and tangentially outwards due to centrifugal forces acting on the solid particles. The smaller, denser organic fraction can pass through the fixed screening drum (7) and settle down in the space between the screening drum (7) and the housing (6), and discharge through opening (15) for further treatment.

The larger, less aerodynamically dense residual waste (plastic film, wooden fragments, etc.) continue spirally up to the top of the apparatus where they are discharged freely thanks to aerodynamic velocity (13) and hence are expelled (14) from the apparatus.

Drawing 2 provides a view of the square or rectangular filtration areas (7a) in the stationary screen (7).

Drawing 3 provides a schematic side view of the device for the extraction of organics out of a mixed organics-inorganics liquid waste stream or expired pre-packaged liquid food product. The liquid waste stream (1) is introduced through a flanged opening (16) into the bottom of the separation apparatus.

Drawing 4 provides a view of an exchangeable screen panel.

Drawing 5 provides a view of different field replaceable paddles.

DETAILED DESCRIPTION

The apparatus is an improvement to technology known to those involved in the bio-waste reclamation industry and includes a hopper to receive contaminated organic waste from different sources, a vertical separator that separates the inorganics from the organics by creating a vortex effect in a stationary screening drum by which the solid contaminants (paper, plastic, metals) are blown in a spiral fashion similar to a twister or waterspout upwards and removed from the top, while the organic fraction passes through the filtration drum and is removed from the bottom. The apparatus may be complemented by a grit removal system that removes all sand and grit prior to the digester.

Another application is the use of the apparatus from cleaning diluted waste streams or washdown water in industrial plants.

A major operational problem with existing apparatus is that the waste stream entering the filtration drum (7) may contain large pieces of plastic wrapping film and or long, fibrous strapping material that eventually wrap themselves around paddles (11) and shaft (10) of the paddle screw and block the apparatus. This blockage requires shutting down the separation process and manually removing the blockage—a labor and time intensive process. It was found by the inventor that this type of fouling and blockage of the paddles can be prevented by attaching 2 or more chains (8) to the outer surface of paddle drum (10) and adjacent to entrance (5). The length of the chains (8) should be longer than the length of the paddles (11). The edges rip large pieces of plastic wrapping film and or long, fibrous strapping material but are not essential to this invention, as the primary function of the chains (8) is to throw this large waste material outwards so that it cannot become entangled on paddles (11). The upward movement of the light materials thus starts at the outer position of the vortex and not the center shaft. Hence this invention with the addition of chains (8) to the bottom of the paddle drum (10) solves a major operational problem with existing separation technologies, where there can be an accumulation of long fibrous material settling at the bottom of the filtration screen. The chains at the bottom of the device break this fibrous material and allows it to pass through with the other organics.

Another problem with existing apparatus is with the efficiency for organic fraction separation. The perforated drums of existing apparatus use circular perforations that place a limitation upon the process efficiency. The present invention uses square or rectangular perforations that provide, in the case of square openings, considerably more open area than do the existing round openings. This increased area allows for greater throughput or, if desired, a better fractionation of the organic waste stream from the other waste material. Replacing the perforations with square or rectangular openings will increase the drainage of the liquids and at the same time with a rectangular opening with the longitudinal part in the vertical position and the appropriate width decrease contamination of the separated organics fraction.

Another and third novel embodiment of this invention is the use of the separation device for extremely liquid waste stream by adding a flanged feed entry rather than feeding the separator through a feed auger. Digestate, wastewater, industrial waters containing light suspended solids aluminum pieces, plastics etc. can be fed into the vertical separator.

The apparatus has also its place in the removal of inorganic solids prior to dewatering.

Existing filters used for removing solids out of a waste stream are working intermittent because of the need of backwashing. The apparatus that is described in this invention now becomes a continuous filter without the need of backwash and have the parts that are removed by the filter dryer than they could have been in a filter with backwash.

When the waste stream contains very little packaging material, the use of a level sensor will allow for a continuous flow for the liquid, but as the solids build up inside the drum and blind the drum while the paddle-screw is not turning, the level increase of the liquid will initiate the starting of the paddle mixer, that can run for a few minutes, go back into idle and start again when the level rises again. The use of this device would allow for using very fine filters even up to the microfiltration level which would increase the separation efficiency.

A fourth novel improvement is the use of exchangeable screen sections (FIG. 4) in the construction of the stationary drum in order to improve the quality of the food waste materials including source-separated organics treating apparatus and a better fractionation of the organic waste stream from the other waste material, by using the correct screen opening for the treated waste and the use of modular replaceable screen panels. It has been found that according to different feed stocks different openings are required in order to reduce the contamination and/or increase the throughput and thus optimize the production process and maximize production, as well as eliminating the need of further filtration by other equipment.

A further object of this invention is to provide a cylindrical screen member having modular elements which permit removal of segments of the screen member for cleaning, maintenance and replacement, and the possibility of changing screen size without disassembling the separation apparatus.

Figure 4:
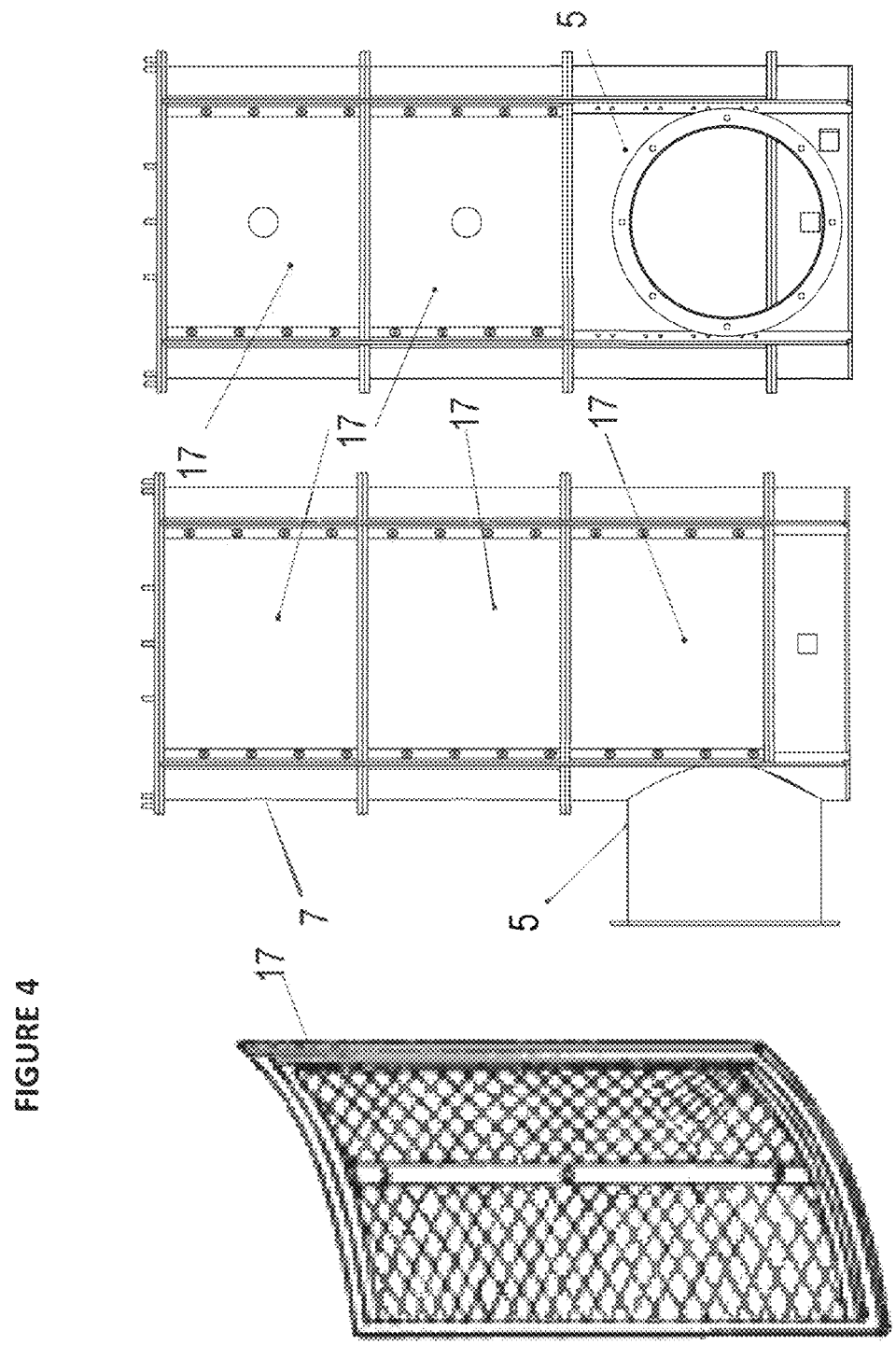

Reference is made first to FIG. 4 which shows a pictorial view of a preferred embodiment of a screen panel in accordance with the present invention.

With the screening device of this invention, if during operation, it is desired to change or replace one of the screen panels, this can readily be accomplished by removing the existing screen panel and replacing that screen panel by another similar modular screen panel, By having extra sets of the modular screen panels, if a screen panel may become damaged or provokes higher contamination and/or reduced throughput, it can be a relatively simple matter to remove one of the screen panels and replace it by another. The construction of the screen cylinder provides a simple and inexpensive construction for the screen member without sacrificing filtration qualities.

While the invention has been described with reference to a preferred embodiment, it is not so limited. Many variations and modifications will now occur to those skilled in the art.

In the prior art replacing the screen size requires to assemble the separation apparatus, and consequently production time lost.

The modular structure also allows for different screen openings according to the height position on the drum and different spacing top and bottom or in between in the single airstream created by the rotating paddles.

The screen panels can be attached to the drum with bolts or screws that are fixed to the drum in the outer perimeter of the openings. This allows to replace the screen openings without disassembling the separation apparatus. Alternatively, they might be inserted in for instance a hinged slotted inclining support that allows the panel to slide into place and put it back in its place. Many variations and modifications will now occur to those skilled in the art.

This allows for a quick replacement of the screens can either increase production (by larger openings or reducing the contamination by using finer screen opening.

However, it is important that the panels have enough strength to sustain the wind pressure created by the twister effect, and impact by heavy contaminants (like glass and pieces of metal)

A fifth novel improvement of the invention is the field replaceable paddles and more specifically the design of the paddles.

Especially for the separation of source separated organics, there is substantial wear on the lower paddles. Rather than having to replace the whole paddle-mixer field replaceable paddle welded to the shaft offer an advantage (11A), This results not only a lower maintenance cost, but also in longer total production run and thus a higher organics production.

Paddle 11A shows a basic design of a paddle where a Hardox or hard surfaced plate is attached to the support plate.

It has been found that paddles (11A) that are simply attached to the brackets mounted on the rotating paddle-drum put extreme pressure on the brackets making them bend upwards or downwards.

An example of a design of the extra resistant paddles (11B) that allows to give extra strength to these brackets by absorbing and distributing the pressure that has been put on the paddles. The paddles can be made in metal of composite materials, and/or covered with a protective layer i.e. tungsten carbide or epoxy. The paddles (11B) are designed such that a thick enough paddle is carved at the bottom in order to perfectly position the support in the crevasse (FIG. 5), thus protecting the bracket from abrasion and at the same time giving support to the bracket and giving the bracket almost the strength as if the complete bracket was welded to the shaft. For mixed waste application, paddle 11B can be used over the whole length of paddle-mixer, but in order to control the dryness and cleanliness of the packaging paddle 110 might be considered.

This novel type paddle (11C) is an example of a directional adjustable paddle. It is adjustable in a 360-degree angle. There are many ways to accomplish this added feature and a person familiar with the art can implement this change. An example of this is making number of circular treaded openings in the central drum of the paddle drum in a helical path. The bolt attached to the bracket is inserted in the shaft in the treaded opening, 2 nuts allow for locking the bracket into place, and the paddle can now be installed in the right-angle position. It is also possible to have a mechanism incorporated so that these paddles can be adjusted without opening the drum. Alternatively, a mechanism could be incorporated to adjust the settings remotely.

The quantity of paddles can be increased or reduced depending on the application. Also, the size and shape can be adapted to the application.

The use of paddle 11B is always recommended in the lower end of the drum where the feedstock is introduced. Once the packaging material or plastics is removed from the waste stream and started its upward trajectory, the use of paddles type 110 can with the appropriate number of paddles installed, create extra turbulence by changing the inclination on different levels in the drum, or adding additional paddles, thus accelerating or braking the exit flow of the packaging material intermittently, and creating extra turbulence and/or retention time in the airstream, not only to have extra dryness and remove residual moisture, but the remove more contaminants on the packaging material, and thus improve the separation.

The combination of the different screen sizes made possible by the modular design of the drum screen, and the use of 360-degree adjustable paddles allows to have a setup that allows for any combination of wet-dry separation and improve production and separation efficiency.

A sixth novel improvement is the use of different speeds for the paddle screw driven by a motor (12) with adjustable speeds in function of the different products treated, (SSO, Dry foods, packed vegetables, meats, cans, fruits etc.)

The invention claimed is:

1. An apparatus for separating organics from a contaminated organics-inorganics waste stream comprising a hopper (2) to receive the contaminated organics-inorganics waste stream from different sources, and a conveyor (4) that feeds a vertical separator that separates the inorganics from the organics by creating a vortex effect within a perforated drum (7) by which the solid contaminants comprising paper, plastic, and/or metals are blown by air in a spiral pattern upwards and removed from the top of the vertical separator, while the organic fraction is removed from the bottom of the vertical separator, air motion is affected by means of an inner rotating paddle-drum (10) to which a multiplicity of inclined paddles (11) creating a twister effect are attached to its external surface, where fouling of the paddles by plastic wrappings or by long fibrous waste material is prevented by the addition of two or more chains (8) attached to the rotating paddle-drum (10) at the entry level of the feedstock, wherein the length of the chains (8) are greater than the radial dimension of paddles (11) but shorter than the radial distance between paddle-drum (10) and the perforated screening drum (7).

2. An apparatus for separating organics from a contaminated organics-inorganics waste stream comprising a hopper (2) to receive the contaminated organics-inorganics waste stream from different sources, and a conveyor (4) that feeds a vertical separator that separates the inorganics from the organics by creating a vortex effect within a perforated drum (7) by which the solid contaminants comprising paper, plastic, and/or metals are blown by air in a spiral pattern upwards and removed from the top of the vertical separator, while the organic fraction is removed from the bottom of the vertical separator, air motion is affected by means of an inner rotating paddle-drum (10) to which a multiplicity of inclined paddies (11) creating a twister effect are attached to its external surface, and wherein the openings in the perforated drum (7) are square or rectangular.

3. The apparatus as described above in one of the claim 1 or 2 where the rotational speed of the paddle drum is adjustable thus allowing to adapt to different teed stocks.

4. The apparatus as described above in claim 1 where chains (8) that are made of a strong, wear-resistant metal or plastic material selected from the group consisting of metal, plastic, carbon steel links, stainless steel links, Kevlar-wrapped and joined metal weights, and a combination thereof, and are square in cross-section or otherwise fabricated so as to provide sharp edges that facilitate the chopping of the fibrous materials that are collected at the bottom of the drum.

* * * * *